(12) United States Patent
Potter et al.

(10) Patent No.: US 7,606,916 B1
(45) Date of Patent: Oct. 20, 2009

(54) METHOD AND APPARATUS FOR LOAD BALANCING WITHIN A COMPUTER SYSTEM

(75) Inventors: Darran Potter, Kent (GB); Andrew Clymer, Wiltshire (GB)

(73) Assignee: Cisco Technology, Inc., San Jose, CA (US)

( * ) Notice: Subject to any disclaimer, the term of this patent is extended or adjusted under 35 U.S.C. 154(b) by 888 days.

(21) Appl. No.: 10/705,158

(22) Filed: Nov. 10, 2003

(51) Int. Cl.
*G06F 15/16* (2006.01)

(52) U.S. Cl. ................................ 709/229; 709/227

(58) Field of Classification Search ......... 709/223–226, 709/229
See application file for complete search history.

(56) References Cited

U.S. PATENT DOCUMENTS

| 5,109,515 | A  | * | 4/1992  | Laggis et al. ............... 707/10 |
| 5,586,254 | A  | * | 12/1996 | Kondo et al. ............... 714/25 |
| 6,587,866 | B1 | * | 7/2003  | Modi et al. ................. 718/105 |
| 6,601,084 | B1 | * | 7/2003  | Bhaskaran et al. .......... 718/105 |
| 6,898,635 | B2 | * | 5/2005  | Jung ........................... 709/226 |
| 7,047,315 | B1 | * | 5/2006  | Srivastava ................... 709/238 |
| 7,174,378 | B2 | * | 2/2007  | Yoon et al. ................... 709/225 |
| 7,185,096 | B2 | * | 2/2007  | Kalyanavarathan et al. .. 709/226 |
| 7,197,547 | B1 | * | 3/2007  | Miller et al. ................. 709/223 |
| 7,237,034 | B2 | * | 6/2007  | Clarke et al. ................. 709/235 |
| 7,328,237 | B1 | * | 2/2008  | Thubert et al. ............... 709/203 |
| 2001/0044893 | A1 | * | 11/2001 | Skemer ....................... 713/153 |
| 2001/0047414 | A1 | * | 11/2001 | Yoon et al. ................... 709/225 |
| 2002/0049842 | A1 | * | 4/2002  | Huetsch et al. .............. 709/225 |
| 2002/0087694 | A1 | * | 7/2002  | Daoud et al. ................. 709/226 |
| 2002/0103846 | A1 | * | 8/2002  | Zisapel et al. ................ 709/105 |
| 2002/0120743 | A1 | * | 8/2002  | Shabtay et al. .............. 709/226 |
| 2002/0156887 | A1 | * | 10/2002 | Hashimoto ................... 709/224 |
| 2002/0165948 | A1 | * | 11/2002 | Vincent ........................ 709/223 |
| 2002/0194335 | A1 | * | 12/2002 | Maynard ...................... 709/225 |
| 2003/0036886 | A1 | * | 2/2003  | Stone ........................... 702/188 |
| 2003/0055971 | A1 | * | 3/2003  | Menon ......................... 709/226 |
| 2003/0061356 | A1 | * | 3/2003  | Jason, Jr. ..................... 709/227 |
| 2003/0065944 | A1 | * | 4/2003  | Mao et al. .................... 713/201 |
| 2003/0079031 | A1 | * | 4/2003  | Nagano ........................ 709/229 |
| 2003/0110259 | A1 | * | 6/2003  | Chapman et al. ............. 709/225 |
| 2003/0123424 | A1 | * | 7/2003  | Jung ............................. 370/338 |
| 2003/0126200 | A1 | * | 7/2003  | Wolff ........................... 709/203 |
| 2003/0126252 | A1 | * | 7/2003  | Abir ............................. 709/223 |
| 2003/0126263 | A1 | * | 7/2003  | Fenton et al. ................ 709/226 |
| 2003/0149620 | A1 | * | 8/2003  | Gaither ......................... 705/14 |
| 2003/0208596 | A1 | * | 11/2003 | Carolan et al. ............... 709/225 |

(Continued)

OTHER PUBLICATIONS

P. Congdon, et al., "IEEE 802.1X Remote Authentication Dial in User Server (RADIUS) Usage Guidelines," Sep. 2003, pp. 1-30.

(Continued)

*Primary Examiner*—William C Vaughn, Jr.
*Assistant Examiner*—Thomas Richardson
(74) *Attorney, Agent, or Firm*—Hickman Palermo Truong & Becker LLP

(57) ABSTRACT

A method and apparatus for load balancing within a computer system makes use of client MAC addresses, reduced modulo N, to direct client requests to a particular server within a server farm. The method is particularly applicable to load balancing applied to AAA servers. In the preferred embodiments, the method can handle failovers and fail-back with few or no aborted authentications.

25 Claims, 6 Drawing Sheets

U.S. PATENT DOCUMENTS

| | | | |
|---|---|---|---|
| 2003/0229697 A1* | 12/2003 | Borella | 709/226 |
| 2003/0236888 A1* | 12/2003 | Chauffour et al. | 709/226 |
| 2004/0006642 A1* | 1/2004 | Jang et al. | 709/245 |
| 2004/0024861 A1* | 2/2004 | Coughlin | 709/224 |
| 2004/0024880 A1* | 2/2004 | Elving et al. | 709/227 |
| 2004/0267920 A1* | 12/2004 | Hydrie et al. | 709/223 |
| 2005/0005006 A1* | 1/2005 | Chauffour et al. | 709/223 |
| 2005/0108397 A1* | 5/2005 | Basso et al. | 709/225 |
| 2006/0112170 A1* | 5/2006 | Sirkin | 709/217 |

OTHER PUBLICATIONS

Anonymous, "IOS Server Load Balancing," feature module description, published by Cisco Systems, Inc., San Jose, California, US, Oct. 30, 2000, 76 pages.

* cited by examiner

Fig. 2A

LUT1

| INDEX | SERVER ADDRESS | ACTIVE? |
|---|---|---|
| 0 | IP S1 | YES |
| 1 | IP S2 | YES |
| 2 | IP S3 | NO |
|  |  |  |

LUT2

| MAC | SERVER ADDRESS | EXPIRED? |
|---|---|---|
| ADDR1 | IP S1 | YES |
| ADDR2 | IP S2 | NO |
| ADDR3 | IP S3 | NO |
|  |  |  |

212A    212B    212C

METHOD AND APPARATUS FOR LOAD BALANCING WITHIN A COMPUTER SYSTEM

FIELD OF THE INVENTION

The present invention generally relates to load balancing within a computer system, and particularly although not exclusively to load balancing between AAA (Authentication, Authorization, Audit) servers. The invention may find particular application, in some embodiments, with multi-message complex protocols such as Extensible Authentication Protocol (EAP).

BACKGROUND OF THE INVENTION

The technology and techniques described in this section are considered to be useable in conjunction with the present invention, but they may not necessarily have been previously conceived, pursued and/or published. Therefore, unless otherwise explicitly indicated, nothing described in this section is prior art to the claims in this application. In particular, there is no admission that anything is prior art merely by virtue of its inclusion within this section.

One common application for load balancing within a computer system (or network) is to spread the authorization and authentication load between more than one AAA server. Traditional load balancers typically use a variety of techniques for random load balancing between AAA servers, but none of these are particularly well-suited for one of the most commonly used protocols, namely the Extensible Authentication Protocol (EAP). Varieties of this protocol in use include Lightweight EAP (LEAP) and Protected EAP (PEAP). Similarly, conventional load balancers cannot easily—or in many cases at all—make use of some of the advanced features that modern AAA servers can offer, such as maximum session checking and IP address allocation/revocation because these features tend to rely on the same AAA server receiving all the AAA traffic for the end user or device in order to maintain appropriate state information.

The Institute for Electrical and Electronics Engineers (IEEE) recently proposed standards known as 802.1x for passing EAP messages over wired or wireless LANs. While some current implementations have been adapted for use with EAP using "sticky" timers to tie traffic to a given AAA server (AAAS) for a configurable time, these do not work correctly with accounting or at all with 802.1x protocols like EAP-PEAP or EAP-TLS where the AAAS may be required to keep state over the entire user session (which may perhaps last for hours). For example, when wireless LANs (WLANs) are deployed, session re-keying is often required. Most of the more recent WLAN AAA protocols employ an encrypted "tunnel" which use key exchange dialogues that are costly in terms of CPU usage and network bandwidth. Hence, there is a desire to ensure the same AAA server receives both the initial authentication and subsequent re-key requests.

One of the difficulties with EAP authentication is that it is not a once-off procedure. Often, several challenges and responses are required, for example because the protocol payload is simply too big to fit into a single packet (e.g., in Remote Authentication Dial-In User Service (RADIUS) protocol, the maximum packet size is 4K). In other cases, the specific protocol in use may itself dictate that several exchanges are required (for example where a back-end server detects that the password has expired and needs changing). Of course, it is critical that every message in the exchange is sent to the same server, since if the load balancer sends sequential messages to different servers, then authentication failures/errors will inevitably occur. The "sticky" timer may allow the initial authentication exchange to be tied to a single AAAS but subsequent re-key exchanges (that may occur minutes or hours later) may well go to another AAAS that does not have the required state information.

EAP authentication has become the mainstay of WLAN based authentication and is now on the verge of mainstream adoption for generalised LAN access also. But with the new deployment models comes much increased levels of network traffic and AAA processing (for example, EAP-TLS requires far more message exchanges than prior protocols). Regular wireless session re-keying and re-authentication add to this workload. Traditionally there may have been a few thousand remote users. Now there may be many tens of thousands of such users, all relying on the AAAS for their office-based LAN access.

There is accordingly a clear need for a load balancer, and a method of load balancing, which are capable of at least alleviating these difficulties. Such solutions may but need not make use of EAP.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a block diagram of a first lookup table that maps index values to resource addresses;

FIG. 2B is a block diagram of a second lookup table that maps client unique identifiers to resource addresses.

DETAILED DESCRIPTION OF THE PREFERRED EMBODIMENT

Figure 1A:
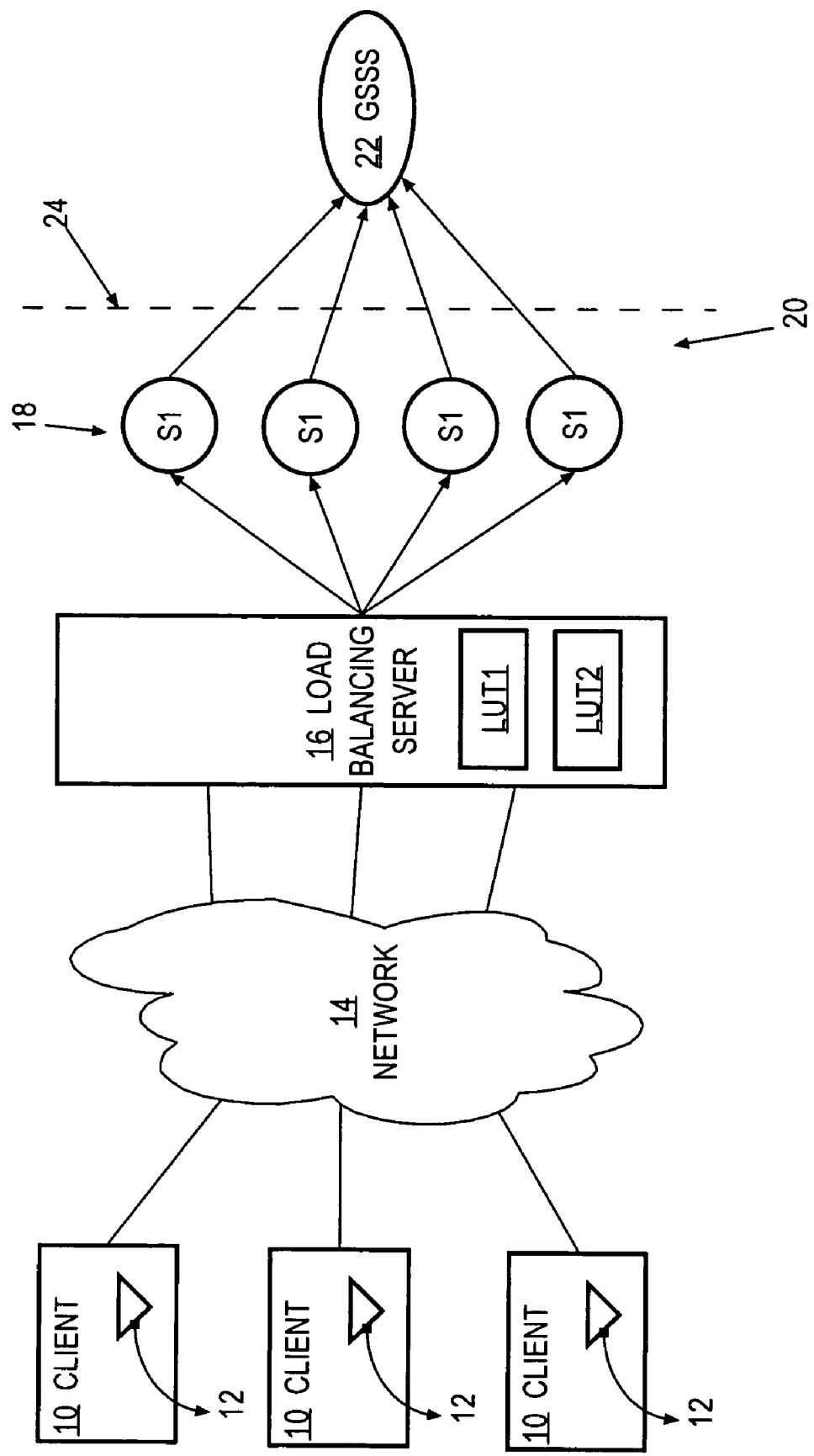
FIG. 1A is a simplified schematic block diagram illustrating an overview of the operation of a load balancer.

A method and apparatus for load balancing within a computer system is described below. The described embodiment uses EAP in the context of 802.1x for AAA, although the invention in its broadest form is not restricted to any specific protocol, neither is it restricted only to AAA applications. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 General Overview

The needs identified in the foregoing Background, and other needs and objects that will become apparent from the following description, are achieved in the present invention, which comprises, in one aspect, a method for providing load balancing within a computer system, particularly though not exclusively load balancing between multiple AAA servers within a cluster or server farm.

In one aspect of the present invention, a method of load balancing within a computer system includes the steps of: (a) receiving a message representing a request for computer resources from a remote supplicant, the message including a unique supplicant identifier; (b) extracting the identifier from the message; (c) associating the remote supplicant with one of several available resources, depending upon the supplicant identifier, and storing this association information. When further messages arrive, they are forwarded toward the proper associated resource on the basis of the stored information. The further messages may either be passed on, as received, or they may be modified in some way and the information within them simply passed on as required to the associated resource.

In a preferred embodiment, the identifier preferably represents a media access control (MAC) address. Preferably, the message requests authentication and is designed to be passed on by a load balancing server (LBS) to one of a number of AAA servers within a server farm.

The invention in other aspects extends to an apparatus for load balancing within a computer system, and to a computer-readable medium carrying a sequence of instructions which, when executed, implements the method as described above and as specified in the claims.

Various embodiments may incorporate the following design features:

- User 802.1x devices (wireless access points, switches, etc.) are configured to point to the load balancing server (LBS) instead of the AAA server.
- The LBS uses the MAC Address in a 802.1x RADIUS request to hash down (e.g., by modulo 101) to a set of configured AAA Servers.
- The LBS is massively parallel to handle thousands of packets per second.
- The LBS is not a RADIUS proxy but a relay—and hence packets are not modified.
- The AAA server uses the NAS-IP-Address attribute (in preference to peer address) to select a network access server (NAS) configuration and hence a shared secret for use in encrypted communications among the AAA server and NAS. In order to preserve RADIUS proxy functionality (where the peer address must always be used) this behaviour may be configurable.
- The LBS can handle failovers (when an AAA server becomes unavailable) with only a minimum of aborted authentications.
- The LBS can handle fail-back (when an AAA server comes back into service) with no aborted authentications.
- The LBS preferably performs a load-balancing scheme to select one AAA Server from among a set of identically configured AAA Servers. In one embodiment, a modulo N operation is performed on the client MAC address, and the resulting value is used as an index to select one of the AAA Servers.

Using the methods mentioned above, and described in more detail below, embodiments can provide a transparent and efficient deterministic distribution of workload to a AAA server farm, with no single point of failure, and with provision for the simple deployment of new or replacement AAA servers when required, for example when the system throughput needs to be increased.

In one embodiment, a load balancing method:
- Allows EAP methods such as EAP-TLS and EAP-PEAP to be load balanced successfully.
- Ensures all AAA traffic for a given user is processed by the same AAA server.
- Can be used standalone or in conjunction with a GSSS (Global Session State Server).
- Can be implemented as a stand-alone software product or appliance, or built into an aggregation device.

The present invention, in one or more of its various aspects, may find particular application in the deployment of large scale 802.1x networks. At present, network administrators must typically deploy AAA servers into each 802.1x location, and scale each server so that it can handle the traffic that is generated in each location. In many locations, the AAA server may be relatively idle, while in others it may be overburdened. Ultimately, that means higher running costs. By making use of the present method, load balancing between geographic locations can easily be provided, thereby reducing costs and also reducing configuration time.

2.0 Structural and Functional Overview

FIG. 1A is a simplified and schematic block diagram of a computer network suitable for use for implementing the present invention. In this example, a Load Balancing Server (LBS) 16 acts to control access to a number of resources, such as AAA servers S1, S2, S3, S4, contained within a cluster 18 on a LAN 20. Incoming requests for remote access to the LAN 20 from one or more client devices 10 such as laptop computers, cell phones or the like arrive via a variety of wired or wireless communications channels, indicated by cloud 14, and are switched by the LBS 16 to one of the AAA servers S1, S2, S3, S4 in such a way that the load on the servers is approximately balanced. For descriptions herein in the context of EAP authentication, the term "supplicant" also refers to client devices 10; the term "supplicant" is conventional in descriptions of EAP technology because cloud 14 may include network elements, such as access servers, that mediate interactions of the supplicants with the AAA servers and effectively act as clients to the AAA servers. The techniques herein may be used with any form of client or server that is load-balanced.

In a first embodiment, the AAA servers S1, S2, S3, S4 act essentially independently of one another and the entire system comprises those items to the left of the dotted line 24 in FIG. 1A. In a second embodiment, however, a central authority is linked to the individual AAA servers. In one embodiment, the central authority is a Global Session State Server (GSSS) 22. The operation of the central authority—where present—is described in more detail below.

3.0 Load Balancing within a Computer System

Figure 1B:
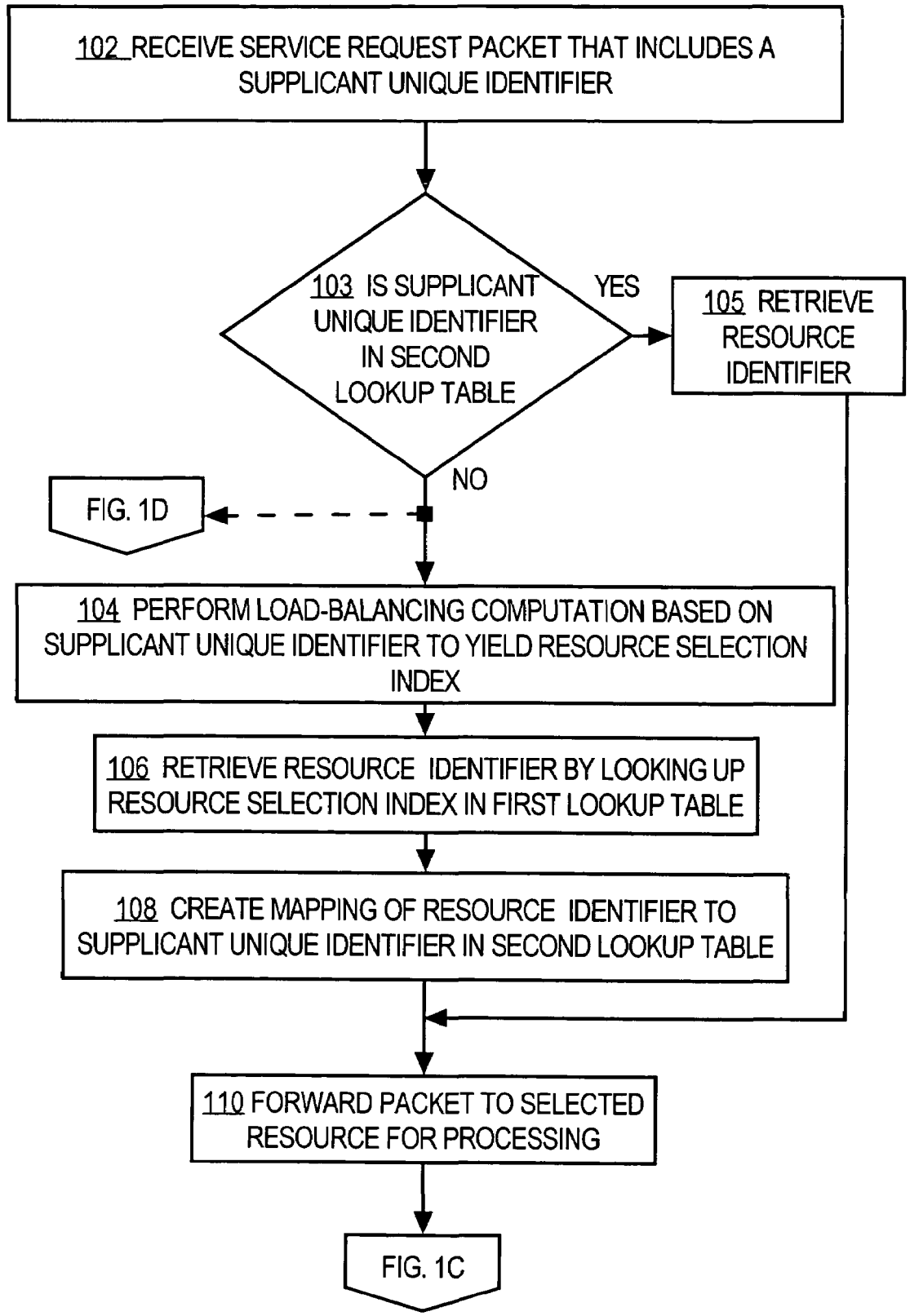
FIG. 1B is a flow diagram of a method of processing resource requests with load balancing.
Figure 1C:
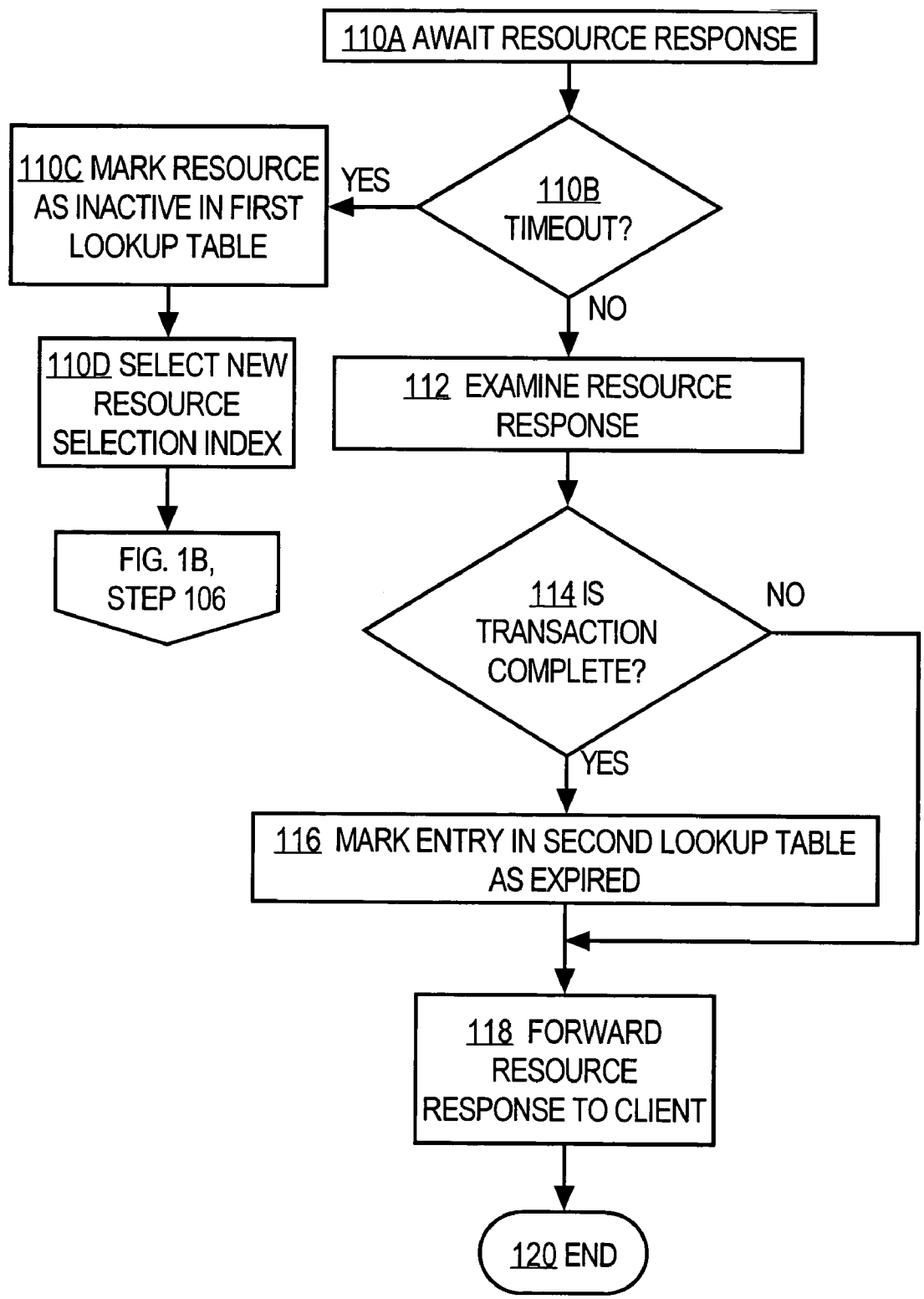
FIG. 1C is a flow diagram of further steps in the method of FIG. 1B relating to processing timeouts and completed transactions.
Figure 1D:
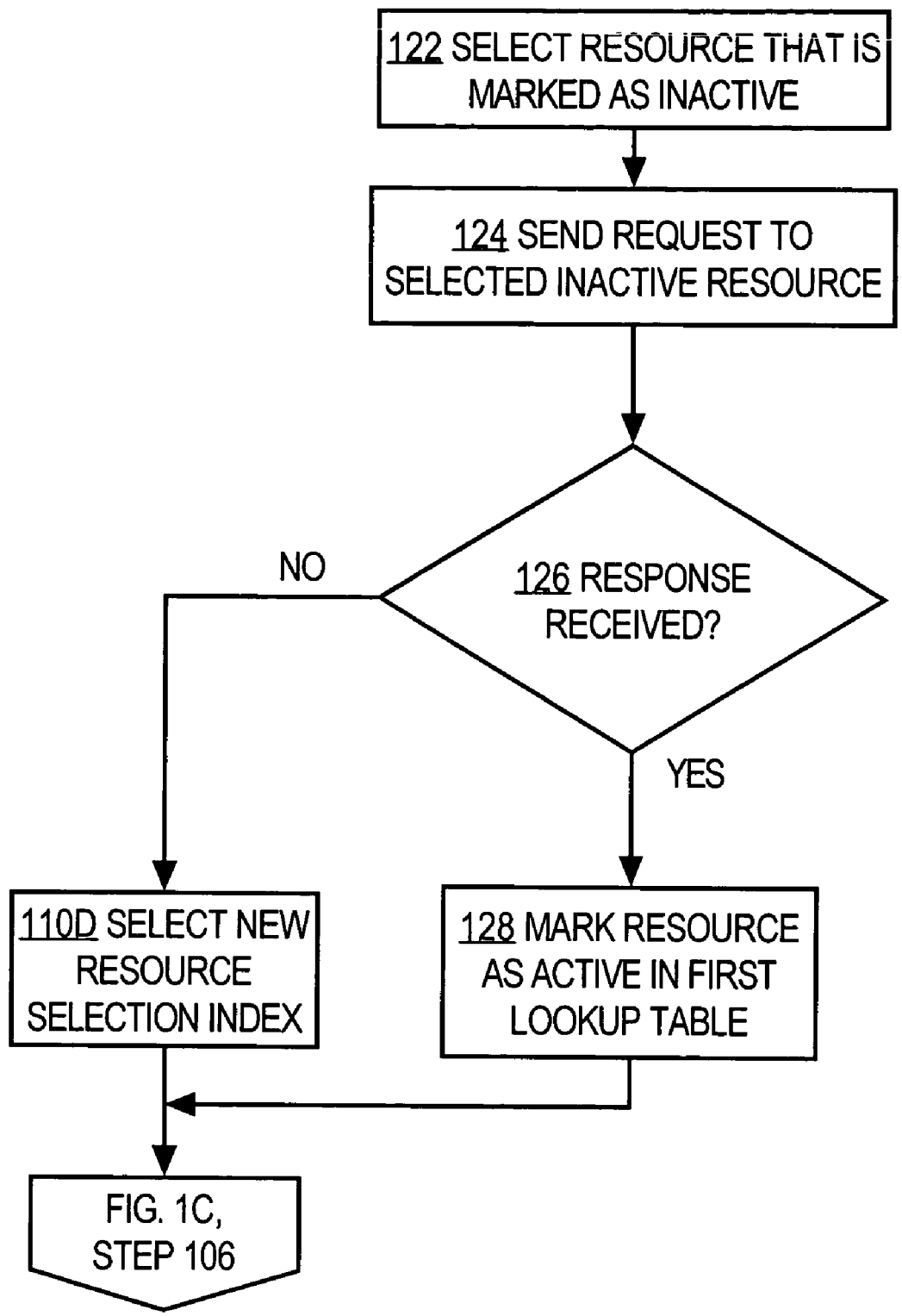
FIG. 1D is a flow diagram of further steps in the method of FIG. 1B relating to processing a re-activated resource.

FIG. 1B is a flow diagram of a method of processing resource requests with load balancing; FIG. 1C is a flow diagram of further steps in the method of FIG. 1B relating to processing timeouts and completed transactions; FIG. 1D is a flow diagram of further steps in the method of FIG. 1B relating to processing a re-activated resource. For purposes of illustrating a clear example, FIG. 1B, FIG. 1C, and FIG. 1D are now described with reference to FIG. 1A. However, the techniques of FIG. 1B, FIG. 1C, and FIG. 1D also are applicable to any other load-balanced network topology or architecture.

Referring first to FIG. 1B, in block 102, a service request that includes a supplicant unique identifier is received. In one embodiment, shown schematically in FIG. 1A, each client device 10 which requests access supplies to the LBS 16 its MAC address 12. The MAC address is one example of a unique identifier of a supplicant, but any other suitable unique identifier may be used. In one specific embodiment, the MAC address 12 is included within a RADIUS EAP identity message (indicating the start of a new authentication sequence). Details of the RADIUS protocol are described in a document entitled "*Remote Authentication Dial In User Service (RADIUS)*" which is available at the time of writing as file rfc3580.txt in the folder rfc within the domain www.ietf.org on the World Wide Web. The entire contents of this document is incorporated by reference for all purposes as if fully set forth herein.

In block 103, a test is performed to determine whether the supplicant unique identifier is in a second lookup table. FIG. 2B is a block diagram of an example second lookup table LUT2, which is described further below. In general, block 103 is a way for LBS 16 to determine if the requesting supplicant is known.

If the requesting supplicant is not known, then in block 104, a load-balancing computation is performed based on the supplicant unique identifier that was received in block 102, to yield a resource selection index value. In one embodiment, upon receipt, the LBS 16 performs a load balancing decision to select one of servers S1, S2, S3, S4 for processing the request; for example, LBS 16 performs a modulo N operation on the client MAC address.

In block 106, a resource identifier is retrieved by looking up the resource selection index value in a first lookup table. In one embodiment, a result value from the modulo operation is used as an index into a look up table to select one of servers S1, S2, S3, S4. For example, LBS 16 maintains a first look up table (LUT 1 as shown in FIG. 2A) that maps MAC addresses (Mod N) to respective IP address IPS1, IPS2, IPS3 and so on of the available AAA servers S1, S2, S3. The size of the table LUT 1 (that is the choice of N) is dependent on the number of AAA servers within the cluster 18, and will normally be the next higher prime number. In the embodiment of FIG. 2A, an index column 202A stores resource selection index values, an address column 202B stores resource address values, and an "Active?" column 202C stores a value indicating whether the associated resource is active. Use of column 202C is described further below.

In block 108, a mapping of the resource identifier to the supplicant unique identifier is created in a second lookup table. In one embodiment, once LBS 16 has obtained the IP address of the chosen server, it then creates an entry in a second look up table (LUT 2 in FIG. 2B) which maps the client MAC address (ADDR1, ADDR2, ADDR3 . . . ) to the IP address of a resource or to some other resource-identifier. As shown in FIG. 2B, table LUT2 may comprise an address column 212A that stores supplicant unique identifiers, a resource address column 212B for resource addresses, and an "Expired?" column 212C that stores flag values indicating whether the supplicant-resource association has expired. Use of column 212C is described further below.

In block 110, the service request packet is forwarded to the selected resource for processing. In one embodiment, packet is transmitted without any changes, to the target AAA server and the LBS waits for the AAA response which, in turn, is returned to the client device 10. Alternatively, the AAA response is returned to an intermediate EAP device—not shown—such as an intermediate router that knows how to route the message back to the originating client device.

If the test of block 103 is true, meaning that previous requests from the same supplicant have been processed, then an abbreviated process is used. In block 105, the resource identifier for the supplicant is retrieved from the second lookup table LUT 2. In one embodiment, when the next EAP packet arrives from the client, the LBS 16 finds the client MAC address in LUT 2, and sends the packet onto the target AAA server.

Referring now to FIG. 1C, in block 110A, a response from the target resource is awaited. In block 110B, a timeout test is performed. In the event of one of the AAA servers failing, the LBS will timeout waiting on the server response. The LBS then tries a set number of re-tries, after which the server is assumed dead. The LUT 1 is then updated to mark this server as dead. As indicated in block 110C, the target resource is marked as inactive in the first lookup table, e.g., column 202C of FIG. 2A. In block 110D, a new resource selection index is selected, and control returns to step 106 of FIG. 1B. In one embodiment, selecting the new index value involves incrementing the previous value; thus, newly arriving EAP Identity requests that would have been directed to this server are then directed to the Nth+1 server (eg S3 instead of S2). Thus, block 110B, 110C, 110D implement a failover process.

By the very nature of EAP authentications, any mid-sequence authentications, at the point of fail-over, will fail. This is because the newly assigned server may not have sufficient state information to complete the authentication. Hence any outstanding requests for the failed server can be dropped. The supplicant will then have to re-authenticate from the start.

To facilitate safe fail-back, the LBS periodically attempts to authenticate a new supplicant to the primary server. Referring now to FIG. 1D, in block 122, a server that is marked inactive is selected, and in block 124 the supplicant request is sent to the selected inactive resource. In block 126, a test is performed to determine if a response is received. If so, then in block 128 the inactive resource is marked as active in the first lookup table. Thus, in an embodiment, if the failed resource comes alive again, the LBS updates LUT1 to indicate the new "alive" status. Now the need for the two LUTs becomes clear. If globally the LBS put all failed-over traffic back to the newly-alive server, any in-progress authentications would fail (for the same reason as the initial failover). With the two LUTs the sequence of events is:

New authentication sequences (for which no state information is stored) use the LUT1 and fail back to the original server.

Authentication sequences already in progress continue through to completion on the fail-over AAA server.

The process of FIG. 1D may be performed at any time when a service request packet is received, as indicated by the dashed line in FIG. 1B.

In an alternative embodiment to that described above, the system may include a Global Session State Server (GSSS), as indicated by reference numeral 22 in FIG. 1A. The GSSS stores all session details centrally so that, if a main server goes down, a new incoming request can be routed to a new server and the necessary session details picked up from the GSSS.

In this scheme, the LBS ensures that most of the time, any given end-user will be authenticated (and re-keyed), authorised and accounted on the same server. Each server behaves as an efficient write-through cache updating both itself and the GSSS as each authentication/accounting operation completes. If a server is taken out of service any EAP-TLS/EAP-PEAP based re-key authentications would normally be rejected by the secondary AAAS because of a lack of state. In this scheme the secondary server can retrieve the required state from the GSSS and complete the re-key authentication. Note that the GSSS is not updated upon every EAP packet arriving at the AAAS—only at the point of authentication completion.

Referring again to FIG. 1C, if no timeout occurred at block 110B then in block 112 the resource response is examined, and in block 114 a test is performed to determine if the supplicant-resource transaction is complete. If so, then the entry for the supplicant is marked as expired in the second lookup table, at block 116, e.g., column 212C of table LUT 2 in FIG. 2B. For example, when a response from the AAA server contains an EAP-Success message, the entry for the associated supplicant in LUT 2 is marked expired and is then kept for a pre-configured period after which it is garbage-collected. Otherwise, the resource response is forwarded to the supplicant at block 118. The expiry period allows for:

the EAP device re-sending the last EAP packet for any reason

EAP methods that require session state to be maintained over the entire session, e.g. EAP-TLS and EAP-PEAP where a session might last several hours.

This scheme achieves a coherent distributed session cache with little or no run-time cost.

4.0 Hardware Overview

While the concepts set out above have been described in terms of a purely software solution, it is equally possible for the present invention to be hardware-based and, for example, to be built into a Content Switching Server (CSS) platform. Indeed, this could potentially offer higher throughput because a CSS is essentially a switch, and balancing occurs at near-wire speed. Alternatively, the invention could be embodied within an aggregator device.

Figure 3:
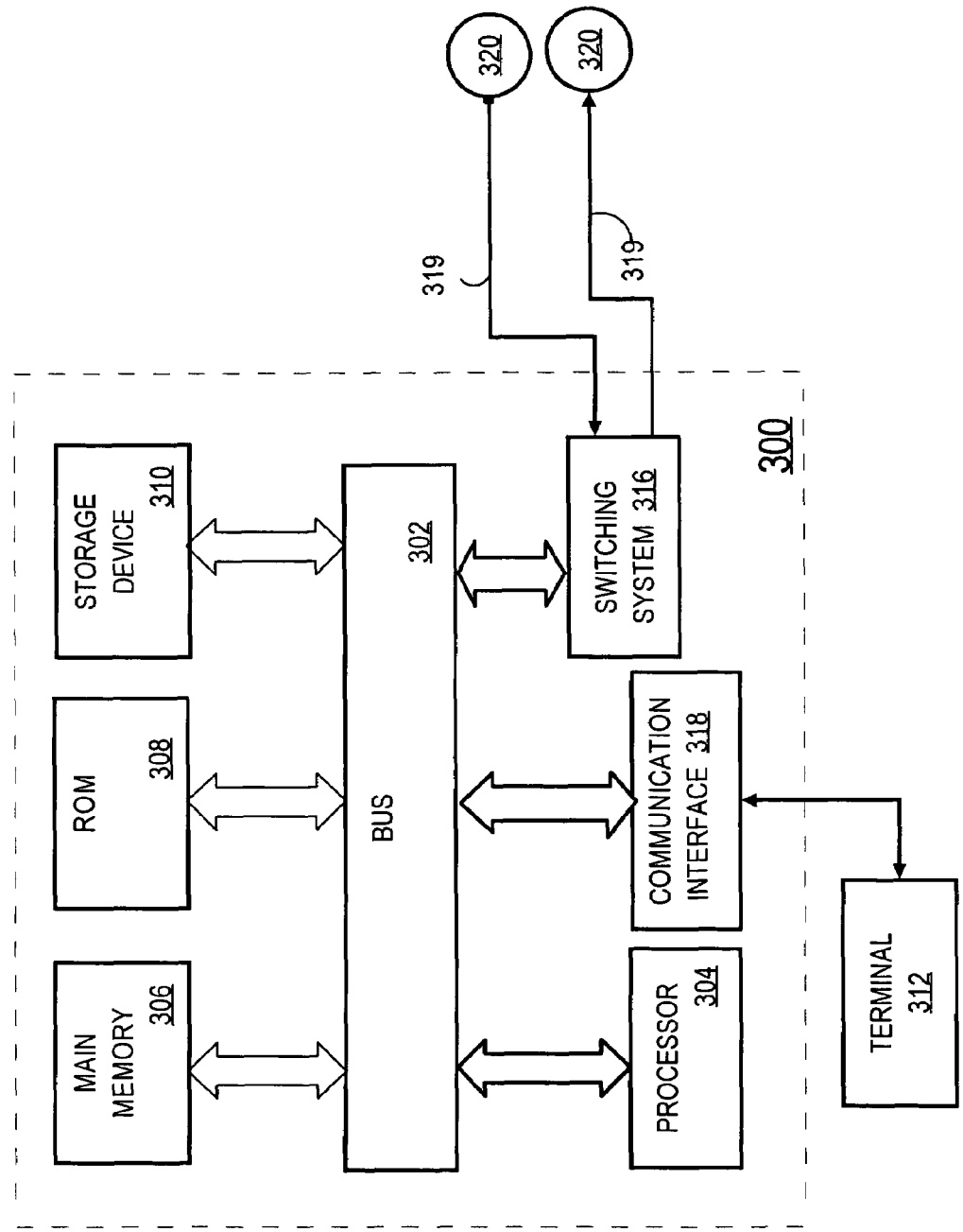
FIG. 3 is a further schematic block diagram that illustrates an exemplary computer system upon which an embodiment of the present invention may be implemented.

FIG. 3 is a block diagram that illustrates a typical computer system upon which the present method may be implemented.

Computer system 300 (this corresponding to the LBS 16 of FIG. 1A) includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. An external terminal 312 or other computer system connects to the computer system 300 and provides commands to it using the interface 318. Firmware or software running in the computer system 300 provides a terminal interface or character-based command interface so that external commands can be given to the computer system.

A switching system 316 is coupled to bus 302 and has an input interface and a respective output interface (commonly designated 319) to external network elements. The external network elements may include a plurality of additional routers 320 or a local network coupled to one or more hosts or routers, or a global network such as the Internet having one or more servers. The switching system 316 switches information traffic arriving on the input interface to output interface 319 according to the method previously described. For example, switching system 316, in cooperation with processor 304, can determine a destination of a packet of data arriving on the input interface and send it to the correct destination such as one of the AAA servers of FIG. 3A using the output interface.

The implementation of LBS functionality is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, DVD, any other optical medium, punch cards, paper tape, any other physical medium with patterns, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Interface 319 also provides a two-way data communication coupling to a network link that is connected to the local network 20 of FIG. 3A. For example, the interface 319 may be an integrated services digital network (ISDN), a DSL card, or a modem to provide a data communication connection to a corresponding type of telephone line. As another example, the interface 319 may be a local area network (LAN) card to provide a data communication connection to the LAN. Wireless links may also be implemented. In any such implementation, the interface 319 sends and receives electrical, electromagnetic or optical signals that carry digital data streams representing various types of information.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In particular, it will be understood that the method described could, instead of using the MAC address, instead use any other unique identifier of a client or supplicant device. For example, the logon user ID could be used in some embodiments, although this would frequently not be desirable since the user ID is frequently not sent until after a suitable encrypted tunnel has been set up between the client device and the point of access to the LAN.

While the preferred method has been described with reference to the EAP protocol, the use of EAP and/or RADIUS is not essential. Instead of RADIUS, Diameter or any other suitably feature-rich protocol could be used. Provided that the MAC address or other client identifier can be reliably transmitted in such a way that it can be used to form the basis of the load balancing scheme, any convenient protocol may be used.

Finally, while the method has been described in connection with load balancing between AAA servers, it will of course be understood that the same approach could be used for load balancing between any network or computer resources.

What is claimed is:

1. A method of load-balancing within a computer system, comprising:
    (a) receiving a message representative of a request for computer resources from a supplicant, said message including a unique supplicant identifier;
    (b) extracting the supplicant identifier from said message; associating the supplicant with one of a plurality of available resources in dependence upon the supplicant identifier;
    storing said association on a load balancing server that is coupled to and logically interposed between the supplicant and the available resources;
    on receipt of a further message including message information from said supplicant, using said association to direct said message information, as originally received, toward said one resource; and
    recording supplicant identifiers as messages are received, and storing each said respective identifier in an identifier look-up table against the respective resource with which it has been associated; and
    maintaining a function look-up table, the table storing an identifier of each available resource for each possible output of a mapping function based on the supplicant identifier, and in which,
    if no entry currently exists in the identifier look-up table on receipt of a message from a supplicant, making the association in dependence upon the function look-up table, and
    writing a new entry to the identifier look-up table;
    wherein the method is performed by one or more computing devices.

2. A method according to claim 1 in which the supplicant identifier is representative of a media access control (MAC) address.

3. A method according to claim 1, including the step of applying an access policy to the message, and associating the supplicant with the said one of the available resources if the policy so permits.

4. A method according to claim 1 including relaying said further message toward said one resource.

5. A method according to claim 1 in which the message or further message is a Remote Access Dial In User Service ("RADIUS") packet.

6. A method according to claim 1 in which the message or further message uses the Extensible Authentication Protocol (EAP).

7. A method according to claim 1 in which the mapping function comprises calculating the value of at least a part of the supplicant identifier using a modulo N operation, where N is a positive integer greater than or equal to the number of resources available.

8. A method according to claim 1 in which, on receipt of the further message, a check is first made in the identifier look-up table and the further message is passed on to the already-associated resource if an entry currently exists in said table for the supplicant identifier within said message.

9. A method according to any one of claims 1 or 8 in which, on receipt of a completion message confirming that the resource is no longer required, the corresponding entry in the identifier look-up table is removed or marked as expired.

10. A method according to claim 1 in which said message is representative of an authentication request, and the association step includes associating the remote supplicant with one of a plurality of authentication servers.

11. A method according to claim 10 in which, on completion by the said one of the available resources of an authentication procedure, and on receipt of a completion message confirming completion, the corresponding entry in the identifier look-up table is removed or marked as expired.

12. A method according to claim 10 including maintaining a central store of session-state information, for all available resources, in a global session-state server (GSSS).

13. A method according to claim 1 including maintaining a central store of session-state information, for all available resources, in a global session-state server (GSSS); the central store being updated on completion of an authentication procedure by one of said authentication servers.

14. A method according to claim 12 or claim 13 in which an authentication server requiring session-state information that it does not itself possess obtains said information from said Global Session-State Server (GSSS).

15. The method of claim 1, further comprising:
    configuring the supplicant devices to point to the load balancing server instead of a destination server.

16. The method of claim 1, further comprising:
    the load-balancing server selecting a single authentication server from among a set of identically configured authentication servers.

17. The method of claim 1, further comprising:
    configuring the size of the identifier look-up table in proportion to the number of servers being managed.

18. The method of claim 1, further comprising:
    the function look-up table maintaining a record of expired servers; and
    the identifier look-up table maintaining a record of dead servers.

19. The method of claim 1, further comprising:
    the load balancing server transmitting the message without any changes.

20. The method of claim 1, further comprising:
    the load balancing server transmitting the message to an intermediate Extensible Authentication Protocol (EAP) device that knows how to route the message back to the originating supplicant.

21. A computer readable volatile or non-volatile medium storing a sequence of instructions which, when executed on a processor, cause said processor to carry out the steps of:
    (a) receiving a message representative of a request for computer resources from a supplicant, said message including a unique supplicant identifier;

(b) extracting the supplicant identifier from the message;

(c) associating the supplicant with one of a plurality of available resources in dependence upon a function of the supplicant identifier;

(d) recording supplicant identifiers as messages are received, and storing each said respective identifier in an identifier look-up table against the respective resource with which it has been associated;

(e) storing said association on a load balancing server that is coupled to and logically interposed between the supplicant and the available resources;

(f) on receipt of a further message including message information from said supplicant, using said association to direct said message, as originally received, information toward said one resource;

(g) maintaining a function look-up table, the function look-up table storing an identifier of each available resource for with each possible output of a mapping function based on the supplicant identifier, and in which, if no entry currently exists in the identifier look-up table on receipt of a message from a supplicant, making the association in dependence upon the function look-up table, and writing a new entry to the identifier look-up table.

22. An apparatus for load-balancing within a computer system, said apparatus comprising:

one or more processors;

(a) means for receiving a message representative of a request for computer resources from a supplicant, said message including a unique supplicant identifier;

(b) means for extracting the supplicant identifier from the message;

(c) means for associating the supplicant with one of a plurality of available resources in dependence upon a function of the supplicant identifier;

(d) means for recording supplicant identifiers as messages are received, and storing each said respective identifier in an identifier look-up table against the respective resource with which it has been associated;

(e) means for storing said association on a load balancing server that is coupled to and logically interposed between the supplicant and the available resources;

(f) means for using said association, on receipt of a further message including message information from said supplicant, to direct said message information, as originally received, toward said one resource; and (g) means for maintaining a function look-up table, the function look-up table storing an identifier of each available resource for each possible output of a mapping function based on the supplicant identifier, and in which, if no entry currently exists in the identifier look-up table on receipt of a message from a supplicant, making the association in dependence upon the function look-up table, and writing a new entry to the identifier look-up table.

23. An apparatus for load-balancing within a computer system, said apparatus comprising:

(a) a network interface for receiving a message representative of a request for computer resources from a supplicant, said message including a unique supplicant identifier;

(b) a processor carrying a stored sequence of instructions which, when executed, cause said processor to carry out the steps of:

(i) extracting the supplicant identifier from the message;

(ii) associating the supplicant with one of a plurality of available resources in dependence upon a function of the supplicant identifier;

(iii) recording supplicant identifiers as messages are received, and storing each said respective identifier in an identifier look-up table against the respective resource with which it has been associated (iv) storing said association on a load balancing server that is coupled to and logically interposed between the supplicant and the available resources;

(v) maintaining a function look-up table, the table storing an identifier of each available resource for each possible output of a mapping function based on the supplicant identifier, and in which, if no entry currently exists in the identifier look-up table on receipt of a message from a supplicant, making the association in dependence upon the function look-up table, and writing a new entry to the identifier look-up table; and (c) a switching system for switching which, on receipt of a further message including message information from said supplicant, uses said association to direct said message information, as originally received, toward said one resource.

24. The apparatus of claim 23, further comprising instructions which when executed cause, in response to sending a message from a supplicant to a resource and failing to receive a response from the resource within a specified time after a specified number of attempts, marking the corresponding resource as inactive in the function look-up table, and selecting a new resource selection index.

25. The apparatus of claim 24, further comprising instructions which when executed cause periodically sending a message from a supplicant to an inactive resource, receiving a response from the inactive resource, and marking the corresponding resource as active in the function look-up table.

* * * * *

UNITED STATES PATENT AND TRADEMARK OFFICE
CERTIFICATE OF CORRECTION

PATENT NO. : 7,606,916 B1
APPLICATION NO. : 10/705158
DATED : October 20, 2009
INVENTOR(S) : Potter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1152 days.

Signed and Sealed this

Twelfth Day of October, 2010

David J. Kappos
*Director of the United States Patent and Trademark Office*